Sept. 28, 1937.     A. NORTON     2,094,018
TETHERING DEVICE
Filed April 15, 1935     2 Sheets-Sheet 1

INVENTOR.
Aaron Norton
BY Joseph B. Gardner
his ATTORNEY

Sept. 28, 1937.  A. NORTON  2,094,018
TETHERING DEVICE
Filed April 15, 1935  2 Sheets-Sheet 2
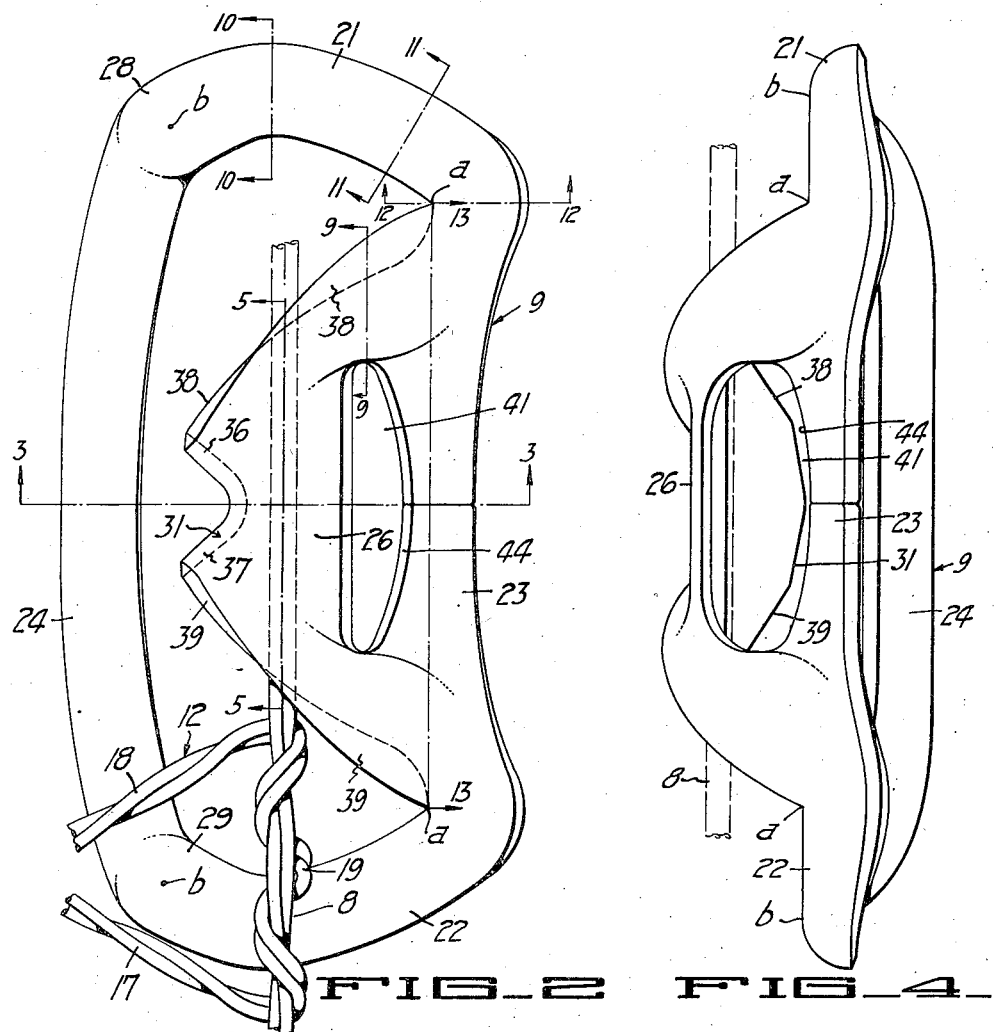
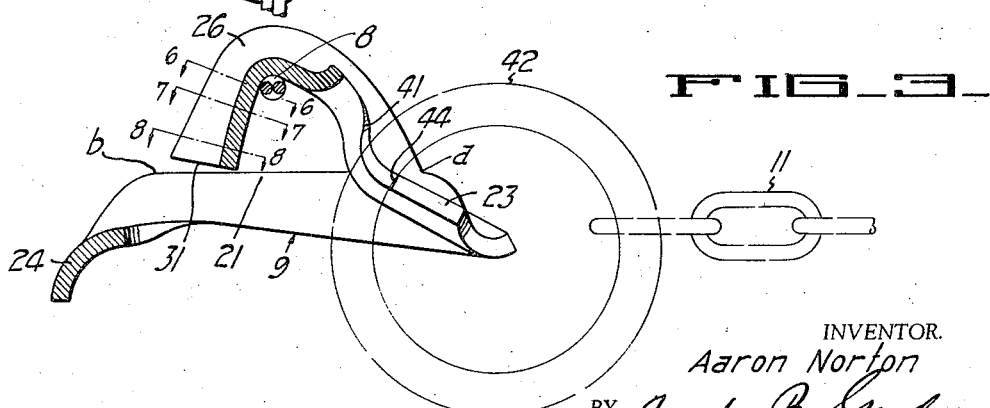
INVENTOR.
Aaron Norton
BY Joseph B. Gardner
his ATTORNEY.

Patented Sept. 28, 1937

2,094,018

UNITED STATES PATENT OFFICE 2,094,018

TETHERING DEVICE

Aaron Norton, Applegate, Calif.

Application April 15, 1935, Serial No. 16,385

6 Claims. (Cl. 119—120)

The invention relates to devices used for limiting the grazing range of an animal.

As is well known, in most instances of road building, especially in the country districts, the road right of way is considerably wider than the road itself. Thus, there is left at each side of the road a strip of land which, during certain seasons of the year is covered with grass and greens, and has, in the past, been looked upon as good grazing land. The difficulty in using this strip, however, has been in keeping the cattle or other grazing animals off of the roadway. Where a tethering stake and chain of the usual type has been used, with a chain length sufficiently short to keep the animals from the roadway, the grazing range offered the animal is too limited to be of any considerable value. In accordance with my invention, however, and as a principal object thereof, I have provided a tethering device which will restrict the grazing range of the animal to a relatively narrow strip at the side of the roadway, but will allow the animal to graze along the roadway for any distance desired.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a perspective view of the means of my invention as the same would appear in use.

Figure 2 is a plan view of the device shown in Figure 1.

Figure 3 is a vertical sectional view taken substantially on the plane of the line 3—3 of Figure 2.

Figure 4 is a side elevation of the device shown in Figure 2.

Figure 5 is a fragmentary vertical sectional view taken substantially on the plane of the line 5—5 of Figure 2.

Figures 6, 7, and 8 are fragmentary sectional views taken substantially on the planes of the lines 6—6, 7—7, and 8—8 of Figure 3.

Figures 9 to 13 are fragmentary sectional views taken substantially on the planes of lines 9—9, 10—10, 11—11, 12—12 and 13—13 respectively shown in Figure 2.

With reference to the drawings, the tethering device of my invention is arranged to be applied to the fence posts 6 of the usual fence 7 set along the boundary line between the road right of way and the adjacent property. In carrying out my arrangement, I mount to the fence posts, but in spaced relation thereto at the outer side of the fence, a guide wire 8 on which is slidably carried for movement along the fence, a member 9. The latter, as will be clear from the drawings, is arranged for connection with the leash chain 11 of the animal so as to permit the movement of the animal along the fence for the length of the guide wire and away from the fence for the length of the chain. The wire 8 is held in spaced relation at the sides of the posts by means of transverse supports 12, which, in the present arrangement, are comprised of a length of relatively stiff wire which is bent around one of the posts and one of the fence wires 13, and then extended from the posts in an outward and downward direction to engage and hold the guide wire 8. When such a wire support is used, I prefer to cross the sides 14 and 16 which extend from the posts, and arrange the spaced outer ends 17 and 18 at the under side of the guide wire 8, and then fold the intermediate end portion 19 of the supporting wire over and around the guide wire. In this manner a rugged support for the guide wire may be effected, although, as will be understood, other means for supporting the guide wires, such as metal brackets or the like, may be used.

An important feature of the present invention is the provision for sliding the member 9 by the supports 12 without disconnecting the member from the guide wire. In accordance with my invention, the member 9 is arranged to automatically position itself for passage by the supports 12 on engagement of the member with the supports, such as when drawn thereagainst by the forward movement of the animal. This feature of the invention is provided principally by the design of the member 9 itself. As here shown, the member is comprised of an open substantially rectangular frame including ends 21 and 22, and forwardly and rearwardly disposed sides 23 and 24 respectively. The ends 21 and 22 are preferably disposed at the under side of the guide wire 8, and an intermediate hook shaped portion 26, here shown formed integrally with the forward side 23, is curved up and over the upper side of the guide wire 8 and down to substantially the plane of the ends, as may be noted from Figure 3, so as to provide together with the ends 21 and 22 a substantially complete enclosure for the guide wire. Thus, the member 9 is loosely mounted on the guide wire for free slidable movement therealong, and at the same time, securely mounted about the guide wire against removal by the opposed and embracing relation of the ends 21 and 22 and the intermediate portion 26.

I provide for the passage of the member by the guide wire supports 12 by spacing the lower end 31 of the intermediate portion both vertically and horizontally from the rear side 24 a distance sufficient to allow the passage of the supports therebetween and further by spacing such intermediate portion from each of the ends by a distance which is greater than the width of the supports 12 at the point where the same is engaged by the intermediate portion. Thus, on advancement of the member 9 such as to approach the end 21 thereof to the support 12, as shown in Figure 1, the member 9 may swing slightly downward so as to allow passage of the end 21 under the support 12, and then swing slightly upward so as to permit passage of the intermediate portion 26 over the support, and then swing downwardly again to permit the passage of the end 22 under the support. In order that this partial rotation or oscillation of the member 9 may be made automatic on engagement of the several portions thereof with the supports 12, the ends 21 and 22 are preferably rounded rearwardly adjacent their rear sides 28 and 29. Further these ends are preferably formed in cross section so as to cooperate with this rounding to provide a smooth and proper deflection and movement of the same on engagement with the supports. Several sectional views have been drawn to illustrate the form and development of these end portions. From substantially the center of the end portions rearwardly to the point $b$ the section is substantially half round as illustrated in Figure 10, taken substantially on the plane of the line 10—10 of Figure 2. Further forwardly the section changes gradually to raise the inner end 32 and to lower the outer end 33 of the section as indicated in Figure 11. At the forward extremity of these ends 21 and 22 where the same join with the forward side 23, the section appears, as shown in Figure 12, where the inner side 32 is further raised and the outer edge 33 depressed somewhat from the position shown in Figure 11 and rounded up slightly. This section is taken directly through the point of intersection of the ends and intermediate portion indicated at $a$ on the drawings. As will be clear from Figure 3, the upper sides of the end portions 21 and 22 are substantially straight between the points $a$ and $b$ and from the latter point the intersection of the ends with the rear side 24 is made through a portion rounding down rather sharply so as to position the plane of the side 24 well below that of the end portions 21 and 22, as shown in Figure 3.

Likewise, the intermediate portion is formed to cause an automatic deflection of the member 9 on engagement with the supports 12. As here shown, perhaps most clearly in Figures 2 and 4, the intermediate portion is convergently tapered from the forward to rear side thereof so as to afford a graduated pitch over its transverse sides for insuring an automatic lifting of the intermediate portion over the supports 12 on engagement therewith. As will also be clear from Figures 2 to 8, the free end 31 of the intermediate portion is formed of substantially U section with the sides 36 and 37 thereof diverging towards the rear of the device. Preferably these sides are relatively flat and disposed in planes inclined to the length of the guide wire 8 so that on engagement with the cross support 12 a proper surface engagement will be afforded for lifting the intermediate portion over the cross wires. The cross section of this end remains constant in outline from the end thereof to an adjacent portion indicated on the plane of the line 8—8 from where the section gradually flattens out to a formation shown in Figure 7. Progressing further forwardly over the intermediate portion the section indicated on the plane of the line 6—6 is further flattened slightly and the ends of the side portions 36 and 37 are turned in slightly. At substantially the top of the intermediate portion, as indicated by the plane of the line 5—5, the section is substantially flat over the intermediate portion thereof with a slight upward curvature of the ends, and from this point forwardly the section reverses its curve over the intermediate portion while maintaining the outer side 36 elevated to a formation shown in Figure 9. Figure 13, which is a transverse sectional view through the forward side 23, shows a final development of the section of the intermediate portion. Another feature that will be noted from Figure 2 and the series of sectional views 5 to 9 inclusive, is the change of bevel of the outer end faces 38 and 39 of the side portions 36 and 37. At the rearward end of the intermediate portion these end faces bevel outwardly, as indicated by the two full lines thereat shown in Figure 2, and gradually change to a vertically coincident position just rearwardly of the plane of the line 5—5 and then reverse the incline of the bevel, as indicated by the dotted line extending from this point to the base of the intermediate portion at the point $a$. This change of bevel is also clearly indicated in the development of the section shown from Figure 7 to Figure 6 to Figure 5.

Also, as will be clear from Figures 1 and 3, the side 24 is preferably bowed rearwardly so as to lie transversely spaced from the end 31 of the intermediate portion, and to, in this manner, allow for the clearance and passage of any crooks, etc. that may be formed in the wire supports 12. Also, as will be understood, the side 24 will, on the upward displacement of the member 9 by contact of one of the ends thereof with the transverse support, serve to engage the under side of the support to thereby prevent sufficient rotation of the member to allow the supports to improperly engage the opposite end of the member.

Connection of the leash or chain 11 with the member 9 is arranged to be effected through an elongated slot 41 formed in the forward side 23 of the member at the base of the rise of the intermediate portion 26. In order to permit entry of the chain ring 42 into the slot, the side 23 is preferably severed adjacent the center of the slot so as to permit opening and closing of said side for the entry and locking into place of said ring. Preferably, the forward side 44 of the slot is rounded slightly about a radius of curvature greater than that of the distance between said side and the inner side of the intermediate portion end 31 so that on drawing of the chain ring 42 against the side 44 the ring will automatically slide to an aligned position with the line of pull and said inner side, as shown in Figure 3, without causing a sufficient sidewise tilting of the member as to pinch or grip the guide wire 8 between the intermediate portion 26 and one of the ends 21 or 22.

It will now be clear that the member 9 by reason of the arrangement of the various surfaces thereon as described will enable the device to automatically position itself for passage by the cross supports of the guide wire on being drawn against such supports, and also over any crook or splices in the wire without incurring any catching or substantial stopping of the free movement of the member over the wire.

I claim:

1. In combination with a guide wire and a transversely extending support therefor, a member arranged for connection to a leash and having spaced transverse portions arranged for positioning about opposite sides of said wire in encompassing relation so as to hold said member slidably mounted on said wire, one of said portions serving on engagement with said support to successively position said portions for passage by said support.

2. In combination with a guide wire and a transversely extending support therefor, a frame arranged for connection to a grazing leash and having spaced transverse portions arranged for positioning about one side of said wire and an intermediate portion arranged for positioning about an opposite side of said wire in encompassing relation so as to hold said member slidably mounted on said wire, said portions being curved so as to automatically and successively position themselves on engagement with said support for passage thereby.

3. A tethering device arranged for use with a row of posts for restricting the range of movement of an animal along said posts comprising, a guide wire, a relatively narrow member connecting each of said posts and guide wire for supporting the latter in spaced relation to said posts, and a member arranged for connection to a leash and having portions disposed about opposite sides of said wire at points spaced a distance greater than the width of said supporting member to thereby permit on rotation of said second named member the passage of said portions by said supporting member.

4. A tethering device arranged for use with a row of fence posts for restricting the grazing range of an animal along a fence comprising, a guide wire, relatively narrow members connecting said posts and guide wire for supporting the latter in spaced relation to said posts, and a frame arranged for connection to a grazing leash and having side and intermediate portions disposed about opposite sides of said wire at points spaced a distance greater than the width of said supporting member, said portions being curved so as to automatically and successively rotate themselves on engagement with said member for passage thereby.

5. A tethering device arranged for use with a row of fence posts or the like for restricting the grazing range of an animal to a relatively narrow strip along the fence comprising, a guide wire, supports connecting said posts and wire for holding the latter in spaced position from said posts, and a frame member arranged for connection to a grazing leash and having the ends thereof disposed at one side of said wire and having an intermediate portion secured to one side of the frame and extending about the other side of said wire and into opposed spaced relation with the other side of said frame, said last mentioned side being offset from the plane of said ends and spaced from said intermediate portion a distance at least equal to the depth of said supports, and said ends and intermediate portions being spaced from each other a distance at least equal to the width of said supports.

6. A tethering device arranged for use with a row of fence posts or the like for restricting the grazing range of an animal to a relatively narrow strip along the fence comprising, a guide wire, supports connecting said posts and wire for holding the latter in spaced position from said posts and a frame member arranged for connection to a grazing leash and having the ends thereof disposed at one side of said wire and having an intermediate portion secured to one side of the frame and extending about the other side of said wire and into opposed spaced relation with the other side of said frame, said last mentioned side being offset from the plane of said ends and spaced from said intermediate portion a distance at least equal to the depth of said supports, and said ends and intermediate portions being spaced from each other a distance at least equal to the width of said supports, said frame portions and said intermediate portion being curved so as to automatically cause the frame ends and intermediate portion to position themselves for passage by said supports.

AARON NORTON.